United States Patent [19]

Takeda

[11] Patent Number: 4,760,586
[45] Date of Patent: Jul. 26, 1988

[54] SPREAD SPECTRUM COMMUNICATION SYSTEM

[75] Inventor: Shigeki Takeda, Tokyo, Japan

[73] Assignee: Kyocera Corporation, Kyoto, Japan

[21] Appl. No.: 814,208

[22] Filed: Dec. 27, 1985

[30] Foreign Application Priority Data

Dec. 29, 1984 [JP] Japan .................. 59-280988

[51] Int. Cl.⁴ .................. H04B 15/00; H04K 1/00
[52] U.S. Cl. .................. 375/1; 375/115; 375/120
[58] Field of Search .................. 375/1, 2.1, 62, 81, 375/97, 120, 115; 455/26, 29, 205; 329/2, 103, 110, 112, 137, 120; 370/107

[56] References Cited

U.S. PATENT DOCUMENTS

| | | | |
|---|---|---|---|
| 4,193,030 | 3/1980 | Rabow et al. | 375/1 |
| 4,241,447 | 12/1980 | Epstein | 455/26 |
| 4,454,604 | 6/1984 | Myers | 455/29 |
| 4,457,003 | 6/1984 | Reed | 375/1 |
| 4,494,238 | 1/1985 | Groth, Jr. | 375/1 |
| 4,518,922 | 5/1985 | Luecke | 375/120 |
| 4,520,493 | 5/1985 | Heard et al. | 375/97 |
| 4,608,701 | 8/1986 | Burgers et al. | 371/1 |

Primary Examiner—Michael A. Masinick
Assistant Examiner—Stephen Chin
Attorney, Agent, or Firm—Spensley, Horn, Jubas & Lubitz

[57] ABSTRACT

Disclosed is a spread spectrum communication system realized by using the frequency hopping coherent detection system wherein such an offset voltage pattern is predetermined by a polynomial is applied to the VCO of the PLL in the receiver thereof, so that the PLL can be operated with a narrow bandwidth because of the narrow bandwidth of the loop filter as well as a decreased loop gain while avoiding tracking break caused by narrow lock range due to the narrow bandwidth of the loop filter as well as the decreased loop gain.

6 Claims, 6 Drawing Sheets

SPREAD SPECTRUM COMMUNICATION SYSTEM

BACKGROUND OF THE INVENTION

The present invention relates to the spread spectrum communication system, and especially to the the spread spectrum communication system wherein the offset voltage pattern of frequency hopping is applied to the VCO of the PLL in the receiver thereof.

A plurality of synthesizer outputs are combined together with the carrier signal in the conventional spread spectrum communication system realized by frequency hopping, and thus a plurality of discontinuous points have occurred in the carrier phase domain. No receiver employing the coherent detection system is suitable for the spread spectrum communication system realized by frequency hopping and, especially in case that the receiver can operate for high speed data transmission, this type of receiver cannot be used for the spread spectrum communication system realized by frequency hopping.

A receiver employing an incoherent detection system has a circuit configuration complicated. Spans between adjacent carriers in the frequency domain are not arbitrary and anti-interference performance obtained by incoherent detection is normally inferior to that obtained by coherent detection.

The objective of the present invention is to present means to make it possible for the spread spectrum communication system realized by frequency hopping to perform coherent detection with a simple detection circuit so that performance of the receiver realized by employing the coherent detection system is superior than that realized by employing the incoherent detection system.

SUMMARY OF THE INVENTION

The spread spectrum communication system realized by frequency hopping in accordance with the present invention employs a coherent detection system, wherein the offset voltage pattern pre-determined by a certain polynomial is applied to the VCO of the PLL in the receiver thereof so that the PLL can be operated with a narrow bandwidth because of the narrow bandwidth of the loop filter as well as a decreased loop gain while avoiding tracking break caused by narrow lock range due to the narrow bandwidth of the loop filter as well as the decreased loop gain.

PREFERRED EMBODIMENTS

The present invention will be described hereafter referring to the attached drawings.

Figure 1:
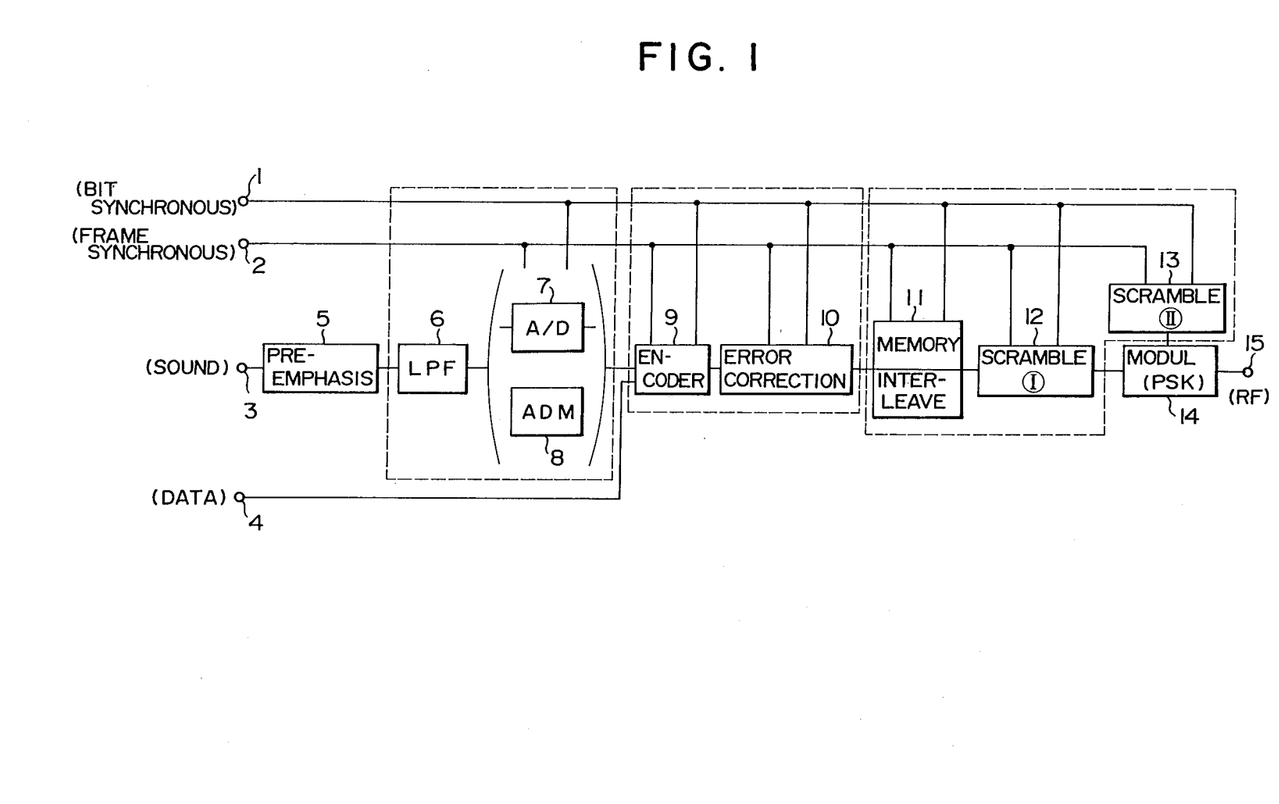
FIG. 1 is a block diagram of the sender in the spread spectrum communication system in accordance with the present invention.

Bit sync signal 1, frame sync signal 2, sound signal 3 and data 4 are fed to the sender as shown in FIG. 1.

Sound signal 3 is fed to lowpass filter 6 through pre-emphasis circuit 5, and the signal frequency bandwidth is limited by lowpass filter 6. The output signal of the lowpass filter is fed to A/D converter 7 and ADM 8 so that the output can be converted into the corresponding digital signal.

The digital signal and data 4 are fed to encoder 9 so as to convert them into serial data.

An error correction code is inserted to serial data in error correction code adder 10, and obtained serial data is interleaved by interleaving circuit 11. The interleaving circuit output is scrambled by 10th-order polynomial circuit. The frame sync signal is also inserted to the scrambled signal in the 10th-order polynomial circuit.

The RF carrier is frequency-modulated to carry out frequency hopping of the RF carrier in accordance with the frequency hopping pattern obtained by 7th-order polynomial and a sweep pattern.

Scrambler circuit 13 modulates the RF carrier to perform secondary modulation. The RF carrier to which primary modulation is to be accomplished is then fed to phase modulator 14 so that the secondary modulated carrier by the output of scrambler circuit 13 is PSK-modulated by scrambled data fed from scrambler cricuit 12 as the primary modulation. The obtained RF carrier signal appears at terminal 15.

Figure 2:
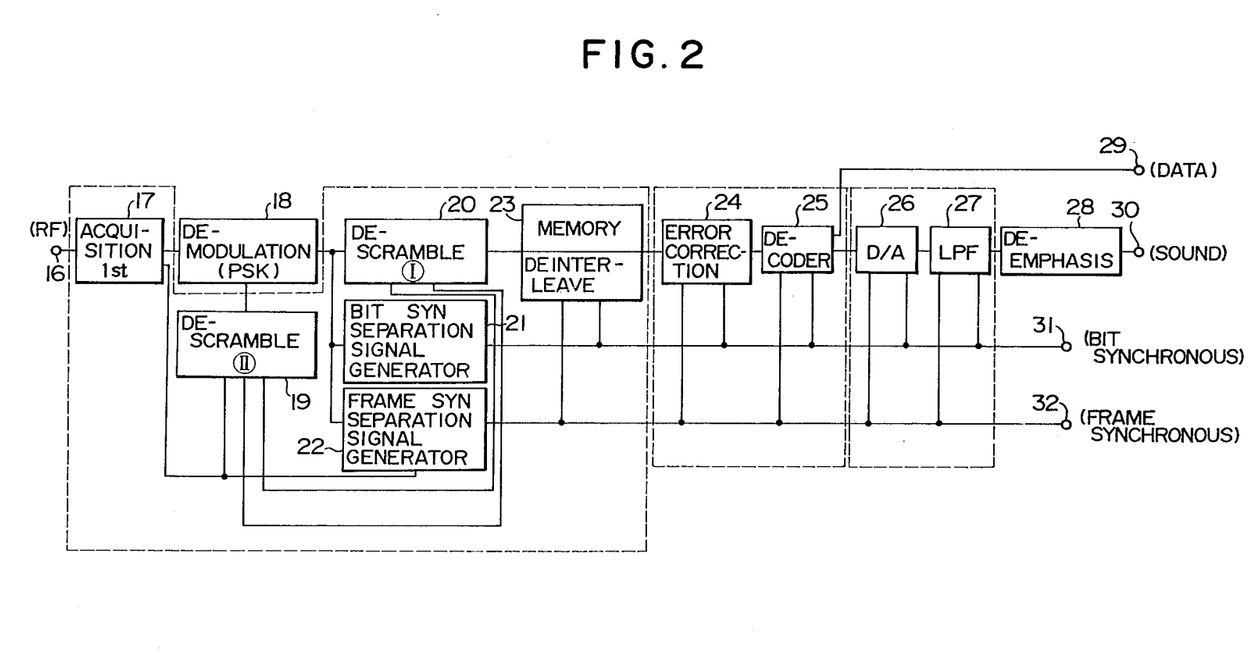
FIG. 2 is a block diagram of the receiver in the spread spectrum communication system in accordance with the present invention.

The receiver will be described hereafter referring to FIG. 2. Received RF signal 16 is fed to acquisition circuit 17 so as to allow the PLL be locked at the designated carrier. A certain sync signal is picked up by using both bit sync signal generator 21 and frame sync signal generator 22. The hopping pattern is reproduced by using hopping pattern generator 19 so as to keep the PLL locked at the designated carrier. At the same time, a descrambling signal by the 10th-order polynomial is generated by using in descrambler 20 so as to descramble the demodulated serial data.

Thereafter, the output of descrambler 20 is de-interleaved by using de-interleave circuit 23 and the output of de-interdleave circuit 23 is fed to error correction circuit 24 so as to correct errors, if any. The output of error correction circuit 24 is fed to decoder 25 wherein serial data is decoded into the sound PCM signal and data 29. The sound PCM signal is fed to D/A converter 26 so that the sound PCM signal is converted into the corresponding audio signal. The output of D/A converter 26 is fed through lowpass filter 27 to de-emphasis circuit 28. The output of de-emphasis circuit 28 appears at terminal 30.

Figure 3:
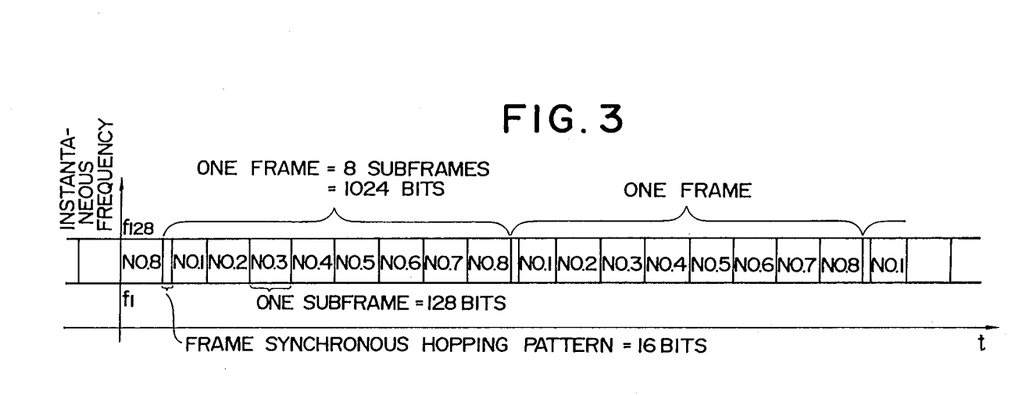
FIG. 3 shows a signal frame format used in the spread spectrum communication system in accordance with the present invention.

The signal frame format in the SS system realized in accordance with the present invention will be described referring to FIG. 3.

One frame consists of 1024 ($2^{10}$) bits and is composed of eight 128 ($2^7$) bit subframes.

Signal is scrambled in each frame by 10th-order PN sequence consisting of 1024 bits. Bits 1 through 16 in each frame constitute a specific sync signal which must not be scrambled.

The frequency-hopped RF carrier is PSK-modulated by the signal scrambled by the 10th-order PN sequence.

The carrier frequency is hopped in accordance with the frequency hopping pattern consisting of 7th-order 128 bit parallel PN sequences in each subframe.

Figure 4:
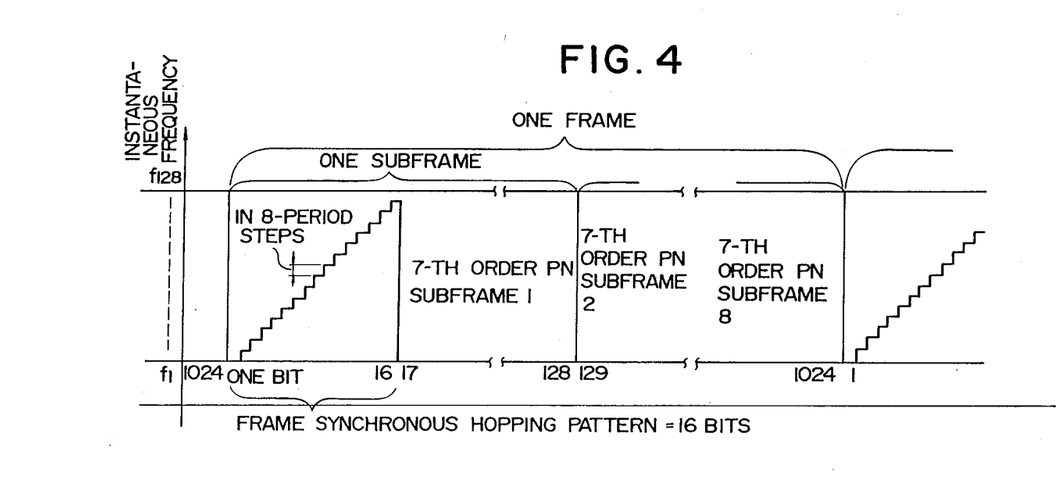
FIG. 4 shows a signal frame pattern in detail.

Bits 1 through 16 of the first subframe in each frame are used to help the PLL be locked in the receiver at the designated carrier. The carrier frequency is swept in such a digital manner as shown in FIG. 4, and bits 1 through 16 of the first subframe cannot be used as part of the 7th-order frequency hopping pattern of the PN sequence.

Signals are scrambled by the frequency hopping patterns whose frequencies are shifted in accordance with the duplex PN sequences consisting of 1024 ($2^{10}$) bits in each frame and of 128 ($2^7$) bits in each subframe. Eight repetitive frequency hopping patterns, each having a period of a subframe, can appear in a frame.

The modulator and demodulator which are used in the spread spectrum communication system in accordance with the present invention will be described hereafter.

Figure 5:
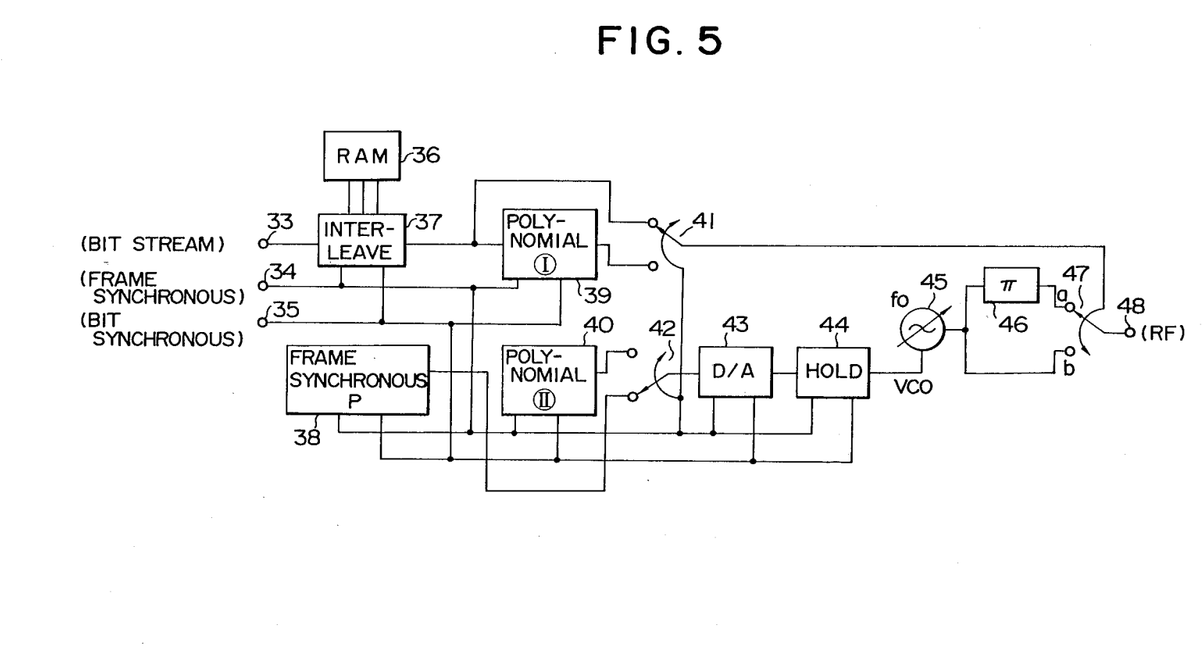
FIG. 5 is a block diagram of the modulator used in the spread spectrum communication system in accordance with the present invention.

FIG. 5 shows a block diagram of the modulator.

First, carrier frequency hopping will be described.

The PN sequence of a 7th order polynomial is generated by using PN generator circuit 40, synchronizing with the bit and frame sync signals.

Subframes having a period of 128 bits are repeated eight times in the PN sequence within a frame consisting of 1024 bits. Bits 1 through 16 of each frame in the frequency hopping pattern constitute a sweep pattern signal for acquisition of the carrier in the receiver, and the sweep pattern signal is supplied from frame sync controller 38.

Either the frequency hopping pattern signal or the sweep pattern signal is selected by switch 42, and the selected signal is fed to D/A converter 43.

The sweep pattern signal is fed from frame sync controller 38 to D/A converter 43 if switch 42 is set at position "b". Bits 1 through 16 of each frame are then designated for use.

The frequency hopping pattern signal for the PN sequence of the 7th-order polynomial is fed to D/A converter 43 if switch 42 is set at position "a". Bits 17 through 1024 of each frame are then designated for use.

When frequency hopping for a frame is completed, switch 42 is set at position "b". Thereafter, the same operations as above are repeated.

The frequency hopping pattern signal passing through D/A converter 43 is fed to hold circuit 44 so as to shape the signal waveform, and then the output of hold circuit 44 is fed to VCO 45.

The frequency hopping pattern signal is fed from hold circuit 44 to VCO 45 and is used to perform frequency modulation in VCO 45. The frequency-hopped carrier or spread spectrum carrier is generated by using VCO 45.

PSK modulation is carried out to the carrier by using phase shifter 46. That is, the output of VCO 45 branches into two routes. One leads to position "b" of switch 47, and the other to position "a" of switch 47 passing through phase shifter 46 which shifts the carrier phase by 180 degrees.

The interleaved signal is scrambled by the 10th-order polynomial of the PN sequence tracked into the frame bits.

Figure 6:
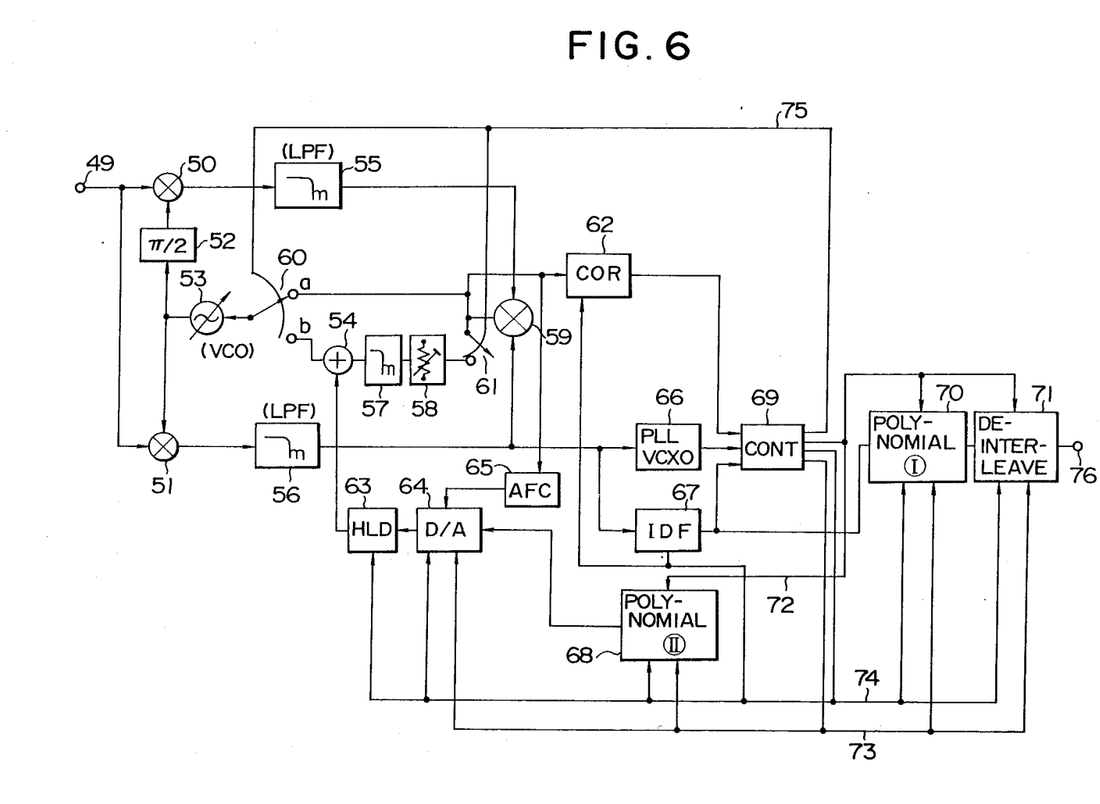
FIG. 6 shows the demodulator used in the spread spectrum communication system in accordance with the present invention.

FIG. 6 shows the demodulator used in the spread spectrum communication system in accordance with the present invention.

Figure 7:
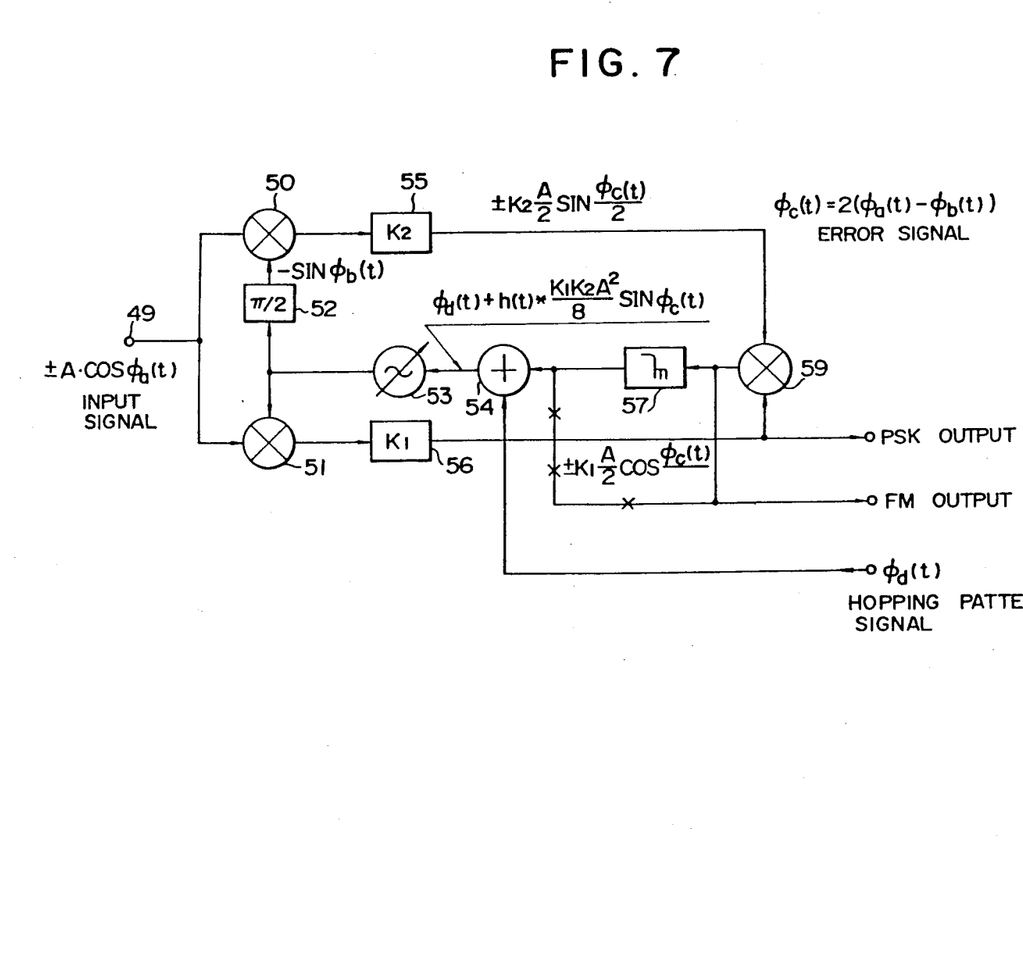
FIG. 7 shows the Costas loop PLL in the receiver used in the spread spectrum communication system.

FIG. 7 shows the Costas loop PLL in the receiver used in the spread spectrum communication system.

Input signal $I = \pm A \cos \phi a(t)$ is applied to input terminal 49. Signs + and − correspond to 1 and 0 of the binary data modulation, respectively.

Input signal branches into two routes. One leads to multiplier 50 and the other to multiplier 51. Signal $\cos \phi b(t)$ is fed from VCO 53 to multiplier 50 through $\pi/2$-phase shifter 52. Input signal $\pm A \cos \phi a(t)$ is then multiplied by signal $\sin \phi b(t)$. Signal $\cos \phi b(t)$ is directly fed from VCO 53 to multiplier 51. Input signal $\pm A \cos \phi a(t)$ is then multiplied by signal $\cos \phi b(t)$.

The outputs of multipliers 50 and 51 are fed to low-pass filters 55 and 56 so that a pair of phase error components with phases orthogonal to each other are produced. The orthogonal components are multiplied by multiplier 59 and resultant phase error signal Ep becomes $$Ep = (K_1 K_2 A^2 / 8) \cdot \sin \phi c(t) \tag{1}$$

Phase error signals Ep is fed through filter 57 to adder 54 so as to add hopping pattern signal $\phi d(t)$ to phase error signal Ep. The result of addition in adder 54 is fed to VCO 53 so as to control instantaneous angular frequency $d\phi d(t)/dt$ of the signal generated by VCO 53.

If adder 54 were not installed and no hopping pattern signal $\phi d(t)$ were added to phase error signal Ep, the normal costas loop would be established.

The above operation is expressed by Eq. (2).

$$d\phi c(t)/dt = 2 \left\{ d\phi a(t)/dt - \phi d(t) - \omega f - (K_1 K_2 A^2 / 8) \cdot \int_{-\infty}^{t} h(t - \tau) \sin \phi c(\tau) d\tau \right\} \tag{2}$$

The left-hand side of Eq. (2) indicates the instantaneous angular frequency of the phase error, the first term in the right-hand side indicates the instantaneous angular frequency of the input signal, the second term in the right-hand side indicates the frequency hopping pattern, the third term in the right-hand side indicates the free run frequency of the VCO, and the fourth term in the right-hand side indicates the phase error signal fed from the loop filter.

If instantaneous angular frequency $d\phi a(t)/dt$ of the input signal is equal to the sum of angular frequency $\omega f$ of free run frequency of the VCO and frequency hopping pattern signal $\phi d(t)$, equation (2) becomes $$d\phi c(t)/dt = -(K_1 K_2 A^2 / 4) \cdot \int_{-\infty}^{t} h(t - \tau) \sin \phi c(\tau) d\tau \tag{3}$$

The right-hand side term of expression (3) approaches asymptotically to zero when "t" becomes infinity.

$d\phi c(t)/dt$ is held zero in this state, and thus the loop is kept stationary. The system can thus be kept stationary even if the carrier frequency is hopped. Thus, the cutoff frequency of the loop filter can arbitrarily be set low and the carrier can be reproduced satisfactorily even if interference is great.

For successful operation, frequency hopping pattern signal φd(t) applied to adder 54 should be tracked into the frequency hopping pattern of the input signal. For satisfactory tracking, the bit and frame sync signals should have been picked up.

First, the bit sync signal is being picked up by using PLL 66 shown in FIG. 6.

The frequency hopping pattern may be demodulated to pick up these signals by the normal Costas loop with higher loop gain and with the loop filter having higher cutoff frequency.

Assume that switch 60 is set at position "a", and that switch 61 is open. Then, the frame sync signal is picked up by correlator 62 which is used to pick up the sweep pattern signal for frame synchronization.

The loop filter has higher cutoff frequency and thus the PLL goes into the stationary state within a short time.

The above operation is expressed as $$d\phi c(t)/dt = 2\{d\phi a(t)/dt - \omega f - (K_1 K_2 A^2/8)\sin\phi c(t)\}. \quad (4)$$

The instantaneous angular frequency of the VCO 53 thus agrees with angular frequency ωa of the input signal. Equation (4) in this state is given by $$d\phi c(t)/dt = 0 = 2\{\omega a - \omega f - (K_1 K_2 A^2/8)\sin\phi c(t)\}. \quad (5)$$

Phase error φc(t) then becomes constant value φk, and sin φk is given by $$\sin \phi k = 8(\omega a - \omega f)/K_1 K_2 A^2 \quad (6).$$

The phase error signal is proportional to the difference between angular frequency ωa of the input signal and free run frequency ωf of the VCO 53 in the stationary state while the PLL is being tracked into the input signal.

Acquisition is an operation to pick up the frame sync signal from the output of the FM demodulator in this state.

As described in equation (6), the phase error signal becomes zero only when angular frequency ωa of the input signal coincides with free run frequency ωf of the VCO 53. The phase error signal is other than zero in the other state, and φk=±π/2 at the edge of the lock range.

When the Costas loop is changed from the acquisition state to the steady tracking state by changing positions of switches 60 and 61 if φk≠0, the systems would go into the steady state after a long period of time and the system would generally be unstable. The reason is that loop filter 57 has an extremely low cutoff frequency or impulse response h(t) exists for a long period of time.

When the same operation is performed if φk≠0, the system starts operating with the steady state and the system stays stable.

From the circuit realization point of view, the delay time within a loop is mainly determined by multiplier 59. Long delay time causes the PLL operation to be unstable especially when the loop gain is high. The higher the loop gain becomes, the wider the lock range becomes. Wide lock range is favorable to acquisition operation.

When the positions of switches 60 and 61 are changed in the steady tracking state, and because the delay times of the adder and loop filter are long, the system would be unstable for higher loop gain. The lock range should be set narrow if excellent anti-interference performance is required. The lock range needs not be wide in the steady tracking state where the frequency of the PLL is tracked into the input signal in the previously described manner.

From the circuit realization point of view, and from the SS system realization point of view, it is reasonable for the Costas loop to have a loop constant which can be changed in accordance with the state of whether the costas loop is used for acquisition or for steady tracking state. The receiver consists of a PLL constructed with elements identified by 49 through 61, forming a costas loop, correlator 62 for use to pick up the sweep pattern, a frequency hopping pattern generator constructed with elements identified by 63 through 65, and a digital signal processor constructed with elements identified by 66 through 76.

Assume that switch 60 of the PLL in the costas loop is set at position "a" and that switch 61 is open. Then, the system is held in the acquisition during initial phase.

Lowpass filters 55 and 56 for use to cutoff the RF components have higher cutoff frequencies, respectively. These filters have short delay times at the baseband frequencies. The frequency response of multiplier 59 is almost the same as that of a video amplifier and multiplier 59 has a short delay time. The gain of multiplier 59 is set so that the lock range of the PLL in the Costas loop covers the bandwidth of spread spectrum due to secondary modulation of the carrier signal.

From Eq. (6), the lock range is given by $$|\omega a - \omega f| = |K_1 K_2 A^2 \sin \phi k/8|.$$

And, from sin φk=±1, $$|\omega a - \omega f| = |K_1 K_2 A^2/8| \quad (7).$$

The lock range can be spread by increasing the input signal amplitude or by increasing the loop gain.

A Costas loop with longer delay time makes the system unstable. The loop gain cannot be increased and thus the lock range cannot be spread in such a case. The circuit parameter is therefore selected so that the delay time of the circuit within a loop is short in the acquisition state, and the lock range is wide enough to allow the PLL to be tracked into the input signal. When the input signal is fed to the PLL in the Costas loop in the above state, the PLL is locked into the carrier to which secondary modulation is accomplished. Then, the FM-demodulated signal which is the frequency hopping pattern or secondary-modulated signal can be obtained from multiplier 59. The output of multiplier 59 is fed to correlator 62 which is used to pick up the frequency sweep signal or frame sync pattern. At that time, the PSK-demodulated signal or primary-modulated signal is obtained from multiplier 51, forming the I axis of the Costas loop, and the output of multiplier 51 is fed through lowpass filter 56 to PLL 66 designated as VCXO for use to pick up the bit sync signal. PLL 66 has a short lock-in time starting with the beginning of a lock-in operation until the system enters the acquisition operation. The lock-in time measures five to six bits or less. Thus, the bit sync signal can be obtained before the frame sync signal is picked up. Correlator 62 for use to pick up the frequency sweep signal is operated by the bit sync signal obtained in accordance with the above operations.

Correlator 62, eliminating noises and unwanted interference signals, picks up a hopping pattern whose differentials are the same in sign for a certain bit length so as to detect the frequency sweep pattern.

In addition, the primary-modulated signal is demodulated in accordance with the PSK-demodulted signal while the bit sync signal has been extracted from the PSK-demodulated signal.

Integrate and dump filter 67, which is operated in accordance with the bit sync signal, eliminates noises and unwanted interference signals. The output of integrate and dump filter 67 is fed to both controller 69 and descramble circuit 70. Upon receipt of the frequency sweep signal representing that the frame sync signal has been picked up, controller 69 determines the location of the frame and detects a zero in bit 16 of the first frame or the last bit of the PSK-demodulated frame sync signal. When bit 17 of the first frame is recognized, controller 69 causes descramble circuit 70, frequency hopping signal reproduction circuit 68, and de-interleave circuit 71 to start operating.

The PN sequence generation circuits operated in accordance with the 10th-order and 7th-order polynomials in descramble circuit 70 and frequency hopping reproduction circuit 68 are the same as those in the sender, respectively.

The loop constant in which the PLL can be tracked into the input signal is unchanged during first frame demodulation, descramble operations, and during frequency hopping pattern signal generation.

When demodulation of the carrier signals in the second frame starts after demodulation of the carrier signals in the first frame is completed, controller 69 changes the positions of switches 60 and 61 so as to change the loop constant in bit 8 or bit 9 when the frequency sweep pattern in the frame sync signal approaches the free run frequency of the VCO 53 in the Costas loop. That is, switch 60 is set at position "b" and switch 61 is closed.

The loop circuit consists of attenuator 58, loop filter 57 and adder 54.

The cutoff frequency of loop filter 57 is set low so that the loop circuit is stable against interferences. Adder 54 is made by using an operational amplifier having longer delay time. Thus, attenuator 58 is used to decrease the loop gain because higher loop gain would make the loop circuit unstable.

The offset signal for the frequency hopping pattern generated by using D/A converter 64 before the positions of switches 60 and 61 are changed is fed to adder 54.

Assume that an error signal in a certain level is fed to multiplier 54 while the loop constant is being changed by changing the positions of switches 60 and 61. Assume that the cutoff frequency of loop filter 57 is set low and that the loop gain is set low. Because of low cutoff frequency and low loop gain, the PLL would go out of the lock range and the PLL should have longer lock-in time.

The frequency sweep pattern approaches the free run frequency of VCO 53 in the Costas loop at bit 8 or bit 9. The phase error signal issued from multiplier 59 approaches zero and no significant transient response can be induced by loop filter 57 even if the loop constant is changed.

As described by Eq. (3), if input signal $\sin \phi c(t)$ fed to loop filter 57 is zero for $-\infty < t < t_1$, $\phi c(t) = 0$ is maintained for $t > t_1$. Then, the costas loop remains in the steady state independent of carrier frequency hopping due to secondary modulation.

The Costas loop follows the fictitious carrier at which no PSK-modulated phase information is contained as Eq. (2), (3) or (4) shows. Thus, the cutoff frequency of loop filter 57 can arbitrarily be decreased so as to pick up the carrier containing no information, which enables the Costas loop to possess excellent anti-interference performance. When the carrier is stably picked up, the PSK-demodulated signal issued onto the I-axis of the Costas loop is correlated by using integrate and dump filter 67 so as to stably extract the modulation signal.

In the SS system wherein the carrier frequency is unchanged to perform direct sequence spread spectrum communication, the phase error signal is always approximately zero independent of the loop constant and the loop constant can easily be changed.

In the frequency hopping system wherein frequencies are more effectively used than in the direct sequence system, a loop filter having a narrow bandwidth can be used for the PLL in the same manner as in the SS system of direct sequence spread spectrum communication. Thus, the circuit can be simplified and superior performance to protect the communication against interference can be realized.

What is claimed is:

1. A frequency hopping spread spectrum communication system comprising:
    transmitter means for transmitting a radio frequency (RF) signal, said transmitter means having a first frequency hopping pattern generator means for generating a frequency hopping pattern and modulator means for modulating the frequency of transmission of the RF signal in accordance with said frequency hopping pattern; and
    receiver means for receiving the RF signal of the transmitter means, said receiver means having a second frequency hopping pattern generator means for generating said frequency hopping pattern, and demodulator means for demodulating the RF signal in accordance with said frequency hopping pattern;
    wherein said demodulator means comprises a phase locked loop circuit for tracking the transmitted RF signal, said second frequency hopping pattern generator means having means for generating a pattern of offset voltages in accordance with said frequency hopping pattern, and said phase locked loop circuit having a voltage controlled oscillator responsive to the offset voltage means wherein tracking breaks caused by hops in the frequency of transmission are avoided.

2. The system of claim 1 wherein the phase locked loop circuit comprises:
    a first feedback path means for providing a first feedback path to the control input of the voltage controlled oscillator;
    a second feedback path means for providing a second feedback path to the control input of the voltage controlled oscillator, said second feedback path means including a low cutoff frequency filter; and
    switch means for alternately coupling the first feedback path means and the second feedback path means to the control input of the voltage controlled oscillator;

wherein the phase locked loop circuit has a first lock range when the first feedback path means is coupled to the voltage controlled oscillator control input and a more narrow second lock range when the second feedback path means is coupled to the voltage controlled oscillator control input.

3. The system of claim 2 wherein the offset voltage generator means is coupled to the second feedback path means so that the voltage controlled oscillator is responsive to the frequency hopping pattern offset voltages when the phase locked loop circuit has the more narrow second lock range.

4. The system of claim 3 wherein the phase locked loop circuit comprises a Costas loop having means for generating a phase error signal in accordance with the phase difference between the transmitted RF signal and the output signal of the voltage controlled oscillator, wherein the first and second feedback path means are alternatively switched by the switch means to provide alternate feedback paths for the output of the phase error signal means to the voltage controlled oscillator control input.

5. In a spread spectrum communication system in which modulated carriers are transmitted from a transmitter and are received by a receiver, the improvement wherein the system comprises a frequency hopping coherent detection system for coherently demodulating the carriers, said detection system comprising a phase locked loop and a frequency hopping signal reproduction circuit in the receiver, said phase locked loop having a narrow bandwith and a decreased loop gain to provide a narrow lock range, said frequency hopping signal reproduction circuit for generating a pattern of offset voltage signals in accordance with a frequency hopping pattern, said offset voltage pattern signals being applied to the phase locked loop so that tracking breaks caused by a narrow lock range of the phase locked loop are avoided.

6. The spread spectrum communication system of claim 5 wherein data signals are carried by the carrier, are scrambled in accordance with a pseudo-noise pattern, are modulated using a phase shift key modulation technique and are transmitted in frames and the carrier further carries frame sync and bit sync signals, said phase locked loop comprising a Costas loop which generates a phase error signal and has a selectable normal bandwidth loop and a more narrow bandwidth loop, said detection system having means for adding the frequency hopping offset signals to the phase error signal generated by the Costas loop to stably operate the detection system, said detection system further comprising a pseudo-noise generator for generating a pseudo-noise pattern, a descrambler for descrambling the data using the pseudo-noise pattern, an extractor which cooperates with the Costas loop for extracting the bit sync and frame sync signals, and a controller for starting the generation of the frequency hopping pattern signals and the pseudo-noise pattern used in de-scramble operations in a first frame while the frame sync signal and the bit sync signal are extracted for an acquisition state by locking the Costas loop onto the carrier input signal, and then changing the loop from said normal bandwith loop to said narrow bandwidth loop in a second frame while the frame sync signal and the bit sync signals are extracted for a steady tracking state by locking the Costas loop onto the input signal.

* * * * *